United States Patent [19]

Kanazawa et al.

[11] 4,379,964
[45] Apr. 12, 1983

[54] METHOD OF FOOD HEATING CONTROL BY DETECTING LIBERATED GAS OR VAPOR AND TEMPERATURE OF FOOD

[75] Inventors: Takato Kanazawa; Keijiro Mori, both of Nara; Shigeru Kusunoki, Yamatokoriyama; Kazunari Nishii, Yamatokoriyama; Tomotaka Nobue, Yamatokoriyama, all of Japan

[73] Assignee: Matsushita Electric Industrial Co., Ltd., Osaka, Japan

[21] Appl. No.: 167,844

[22] Filed: Jul. 14, 1980

[30] Foreign Application Priority Data

Jul. 20, 1979 [JP] Japan .................. 54-93043
Sep. 6, 1979 [JP] Japan .................. 54-114501

[51] Int. Cl.³ .................................. H05B 1/02
[52] U.S. Cl. ........................ 219/492; 219/10.55 B; 219/497; 219/413; 99/327; 426/243; 236/44 C
[58] Field of Search ............. 219/10.55 B, 10.55 R, 219/10.55 M, 492, 497, 490, 491; 99/325, 327; 426/242, 243, 241; 236/44 C, DIG. 8

[56] References Cited

U.S. PATENT DOCUMENTS

| | | | |
|---|---|---|---|
| 3,620,764 | 11/1971 | Watkins | 219/10.55 M |
| 3,839,616 | 10/1974 | Risman | 219/10.55 R |
| 4,097,707 | 6/1978 | Kobayashi et al. | 219/10.55 B |
| 4,162,381 | 7/1979 | Buck | 219/10.55 M |
| 4,191,876 | 3/1980 | Ohkubo et al. | 219/10.55 B |
| 4,217,477 | 8/1980 | Matsubara et al. | 219/10.55 R |

FOREIGN PATENT DOCUMENTS

955 3/1979 European Pat. Off. ..... 219/10.55 R

Primary Examiner—M. H. Paschall
Attorney, Agent, or Firm—Spencer & Kaye

[57] ABSTRACT

A method of food heating control in which the heating time length ($\tau_o$) from a time point ($t_1$) when the food temperature changing with the heating thereof reaches a predetermined set value ($T_1$) to a time point ($t_2$) when the vapor or gas liberated by heating of the food begins to increase the humidity or gas concentration is used as a basis for automatically determining a subsequent heating time length ($\tau_R$). Since the time period ($\tau_R$) for the subsequent heating process is determined by the heating time from the time point when the food temperature reaches a predetermined set value to the time point when the humidity or gas concentration begins to increase (unlike in the prior art method in which the heating time from the start of heating to the time point when humidity begins to increase is used to determine the subsequent heating time), the error in the heating time which otherwise might be caused by the variation in the initial food temperature is obviated. Consequently, it is possible to determine the total heating time without it being substantially affected by the initial temperature of the food.

7 Claims, 16 Drawing Figures

METHOD OF FOOD HEATING CONTROL BY DETECTING LIBERATED GAS OR VAPOR AND TEMPERATURE OF FOOD

BACKGROUND OF THE INVENTION

In heating food, the food begins to boil when the cooking conditions of the food undergo a conspicuous change in temperature at about 92° to 97° C. The length of time from the start of heating to the boiling point of the food depends on the type of food, involving such factors as the specific heat or microwave absorption capacity of the food or the amount of the food and such other factors as the size or the number of units of the food. In addition, such a length of time is greatly affected by the initial temperature of the food.

Figure 1:
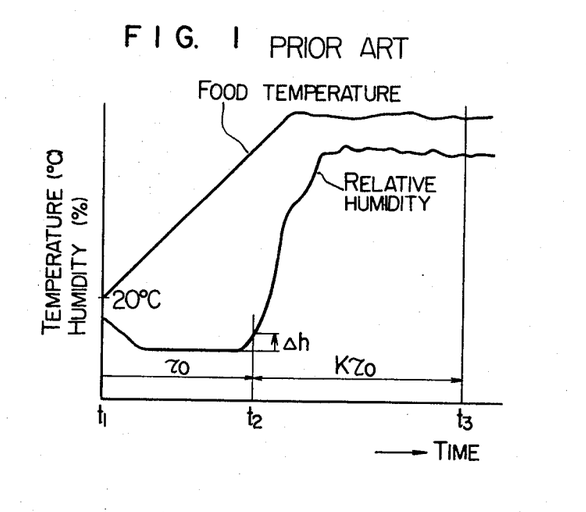
FIG. 1 is a diagram for explaining curves of relative humidity and food temperature in a conventional cooking oven.

Conventional cooking ovens using the detection of humidity are known, for example, from U.S. Pat. Nos. 3,839,616 and 4,097,707. One typical conventional cooking oven operates in the manner shown in FIG. 1. The time length $\tau_o$ from the start of heating the food to the start of boiling of the food is measured and the food further continues to be heated until it is cooked, after a time length $K\tau_o$, i.e., the product of the time length $\tau_o$ and a constant K specific to the food determined by the type and the finished condition of the food. The amount of heat Q required for the food to be properly cooked may be expressed by the equation shown below.

$$Q = m \cdot C \cdot (Tf - Ti) + m \cdot B \quad (1)$$

where C is the specific heat of the food, m the quantity of the food, Tf the temperature at which the water in the food begins to boil, and B a value specific to the food, the value being dependent on the amount of heat associated with the change in quality of the food (or degeneration) and the latent heat of evaporation.

The value Q is given as the product of the microwave power p and the total heating time of the food $\tau$, namely, $Q = p\tau$. Thus the total heating time of the food is expressed as $$\tau = \frac{m \cdot C}{p}(T_f - T_i) + \frac{m}{p} \cdot B \quad (2)$$

The first term of the right side of this equation represents the time length from the starting of heating the food to the boiling of the water in the food, and the second term thereof is considered to represent the time from the start of boiling of the food to the properly cooked up state of the food. Therefore, the equation (2) may be rewritten as $$\left.\begin{array}{l} \tau = \tau_o + K\tau_o \\ \text{where } \tau_o = \frac{m \cdot C}{p}(T_f - T_i) \text{ and} \\ K = \frac{B}{C(T_f - T_i)} \end{array}\right\} \quad (3)$$

In the conventional cooking oven using the detection of humidity, the initial temperature of the food $T_i$ in equation (3) above is assumed to be about 20° C. so that K is considered for convenience to be a constant, with the result that the food heating time is given by equation (3).

The food to be heated for cooking, however, includes that which has been left to stand at a high room temperature, that just taken out of the refrigerator, and frozen foods, etc., which vary greatly in their initial temperature immediately before being heated. The value K for such a wide range of food is not constant but varies greatly. In conventional cooking ovens wherein the value K is assumed to be constant, some types of food or food under certain conditions fail to be finished satisfactorily by reason of the great variety in the initial temperature of the food to be cooked and the resulting wrong setting for the total heating time.

An object of the present invention is to provide a method of food heating control in which the required energy is accurately calculated in spite of different amounts, materials or shapes including the thickness of the food to be cooked, thus realizing automatic cooking in all cooking processes only by designating the type of food without being greatly affected by the amount, shape or initial temperature of the food.

SUMMARY OF THE INVENTION

The present invention differs from the conventional method in which the heating time length from the start of heating to the time point $t_2$, when humidity or gas concentration begins to increase creating a change in ambiance conditions, is used to determine the subsequent heating time. Rather, according to one aspect of the present invention, the subsequent heating time is determined by measuring the heating time $\tau_o$ from the time point $t_1$ where the food temperature reaches a predetermined value $T_1$ to the time point $t_2$ when humidity or gas concentration begins to increase. As a result, the error in determining the heating time which otherwise might be caused by the variation in the initial temperature of the food is obviated, thus making it possible to determine the heating time without being substantially affected by the food initial temperature.

According to another aspect of the present invention, the temperature level $T_1$ is set at a temperature between 40° and 60° C. In other words, the data based on a set temperature lower than the temperature (such as 70° C.) when the food begins to liberate oil or juice is used for subsequent heating control. Means is provided for covering an optical system added for temperature measurement when the particular temperature of 70° C. is reached, thus preventing the optical system from being contaminated. For detection of the temperature $T_1$, an infrared ray temperature detector generally used for low temperature cooking or defreezing heat control may be used economically and advantageously.

According to still another aspect of the invention, the initial heating of the food is effected with low output so that the internal temperature of the food is increased to a level which approximates that of the surface temperature thereof, with the result that the error in determination of the heating time which otherwise would be caused by the variation in the initial temperature of the food is considerably reduced.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Figure 2:
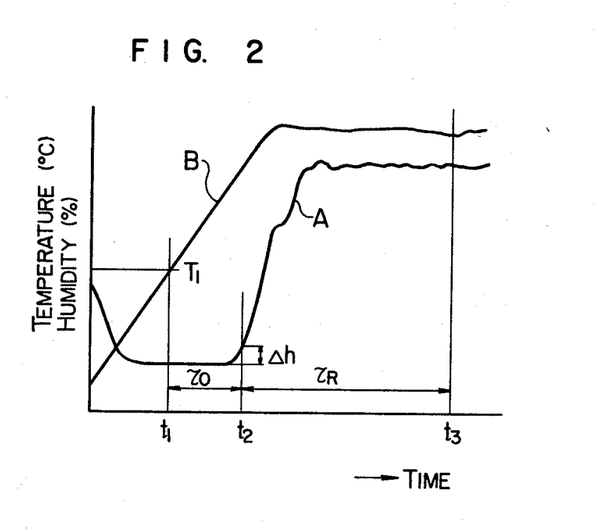
FIG. 2 is a graph showing curves of relative humidity and food temperature in a cooking oven embodying the present invention.

In the control method according to the present invention, in order to eliminate the error of the heating time which otherwise might be caused by the variation in the initial temperature from the start of heating of the food or foodstuff to the time point when the humidity begins to increase, a time point $t_1$ when the food temperature reaches a predetermined set value $T_1$ is taken on the food surface temperature curve B of FIG. 2. The heating time $\tau_o$ is measured from this time point $t_1$ to the time point $t_2$ when the humidity begins to rise so that the heating time length subsequent to the time point $t_2$ is determined. The heating time subsequent to the time point $t_2$ represents a time length $\tau_R$ during which the total amount of heat for cooking the food properly including the heat of evaporation of the moisture in the food and the amount of heat required for improving the taste of the food is applied. Therefore, the time point $t_3$ indicating termination of the time length $\tau_R$ corresponds to the time when heating of the food is completed.

First, the construction and functions of the present invention will be described with reference to a first embodiment of a cooking oven according to a food heating control method of the present invention.

Figure 3:
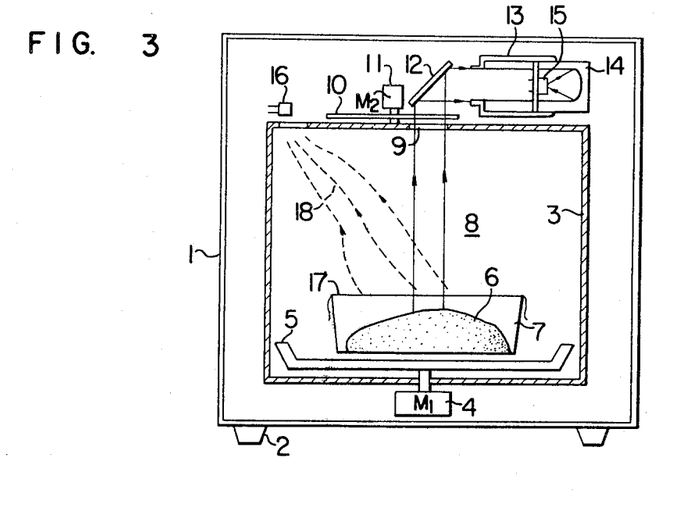
FIG. 3 is a diagram showing the construction of an embodiment of a cooking oven for effecting the method of food heating control according to the present invention.

A cooking oven is shown in FIG. 3, in which a heat source is not shown. Reference numeral 1 shows a case, numeral 2 legs, numeral 3 a wall of a heating chamber, numeral 4 a motor for driving a food receptacle rotationally, numeral 6 food and numeral 7 a dish carrying the food. Numeral 8 is the heating chamber. Numeral 9 shows an opening formed in the central part of the ceiling of the heating chamber 3. Numeral 10 is a chopper blade, numeral 11 a chopper motor, numeral 12 a reflection mirror, numeral 13 a hood for limiting the field of view, and numeral 14 a mirror assembly including a reflection concave mirror. Numeral 15 shows an infrared ray detector. Numeral 16 shows a humidity detector, and numeral 17 a wrapping sheet covering the dish 7. Numeral 18 shows water in the form of steam liberated from the food and breaking through the wrapping sheet 17. The change in humidity caused by this steam is detected by the humidity detector 16.

Figure 4A:
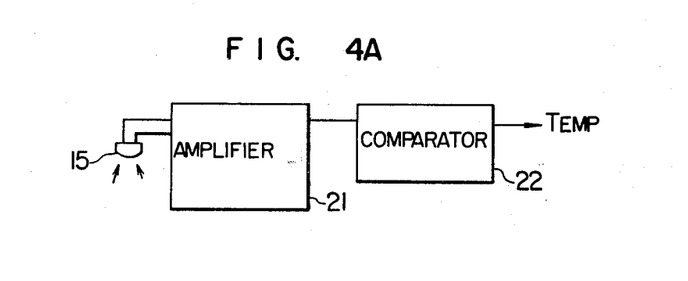
FIG. 4A is a diagram showing the construction of a first embodiment of the temperature detector means of the cooking oven shown in FIG. 3.

In FIG. 2, the curve A represents the change in relative humidity with the heating of the food, and the curve B represents the surface temperature of the food. In FIG. 4A, numeral 15 shows the infrared ray detector, numeral 21 an amplifier for amplifying the temperature signal from the infrared ray detector, and numeral 22 a comparator for comparing the output of the amplifier 21 with the temperature setting $T_o$ and producing a temperature detection signal TEMP if the former is larger than the latter.

Figure 4B:
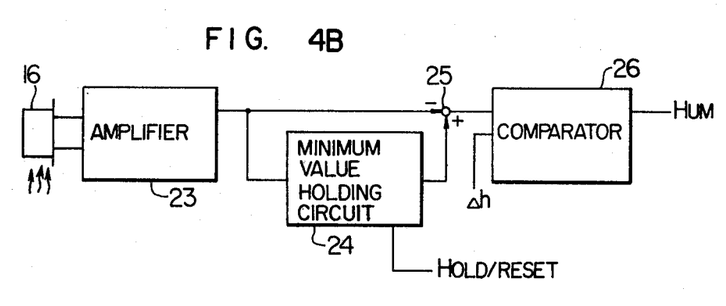
FIG. 4B is a diagram showing the construction of an embodiment of the humidity detector means of the cooking oven according to the present invention.

In FIG. 4B, numeral 16 shows the humidity detector, numeral 23 an amplifier for amplifying the humidity signal, and numeral 24 a minimum value holding circuit for holding at each moment a lesser minimum value of the output voltage of the amplifier 23. Numeral 25 is a subtractor for subtracting the value at each moment of the output voltage of the amplifier 23 from the minimum value held in the minimum value holding circuit 24. The output of the subtractor 25 is compared with the threshold value $\Delta h$ at the comparator 26. If the output of the subtractor 25 is larger than the threshold value $\Delta h$, the comparator 26 detects the relative humidity based on the water steam liberated from the food and produces a humidity detection signal HUM.

A hold-erase signal HOLD/RESET is for holding the holding voltage of the minimum value holding circuit 24 or for resetting and restoring the holding voltage to the initial condition.

Figure 5:
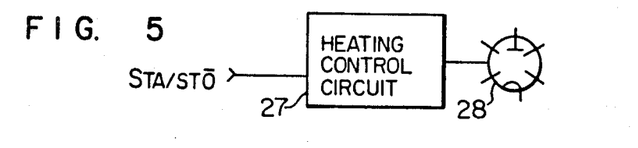
FIG. 5 shows the construction of a first embodiment of the heat control section of a cooking oven according to the present invention.

In FIG. 5, numeral 27 shows a heating control circuit for controlling the activation and deactivation of the magnetron 28 in response to the magnetron start-stop signal STA/$\overline{STO}$.

Figure 6:
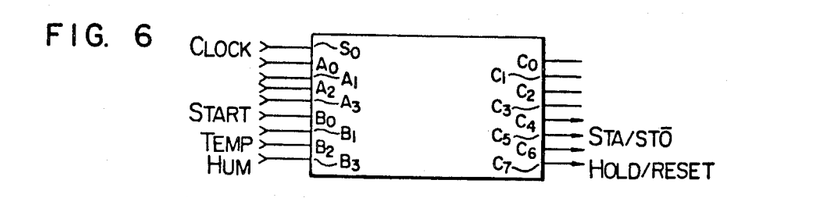
FIG. 6 is a diagram showing a first embodiment of a control unit of a cooking oven according to the present invention.

A control unit according to the present invention using an LSI chip is shown in FIG. 6. This embodiment uses a microcomputer including a general-purpose chip of the stored program type.

Characters $A_0$, $A_1$, $A_2$, $A_3$, $B_0$, $B_1$, $B_2$ and $B_3$ show input terminals, and characters $C_0$ to $C_7$ output terminals. The input terminals $B_0$, $B_2$ and $B_3$ are impressed with a heating start signal START, a temperature detection signal TEMP and a humidity detection signal HUM respectively.

The magnetron start-stop signal STA/$\overline{STO}$ and the hold-erase signal HOLD/RESET for the holding voltage of the minimum value holding circuit 24 are produced at the output terminals $C_5$ and $C_7$ respectively.

Figure 7:
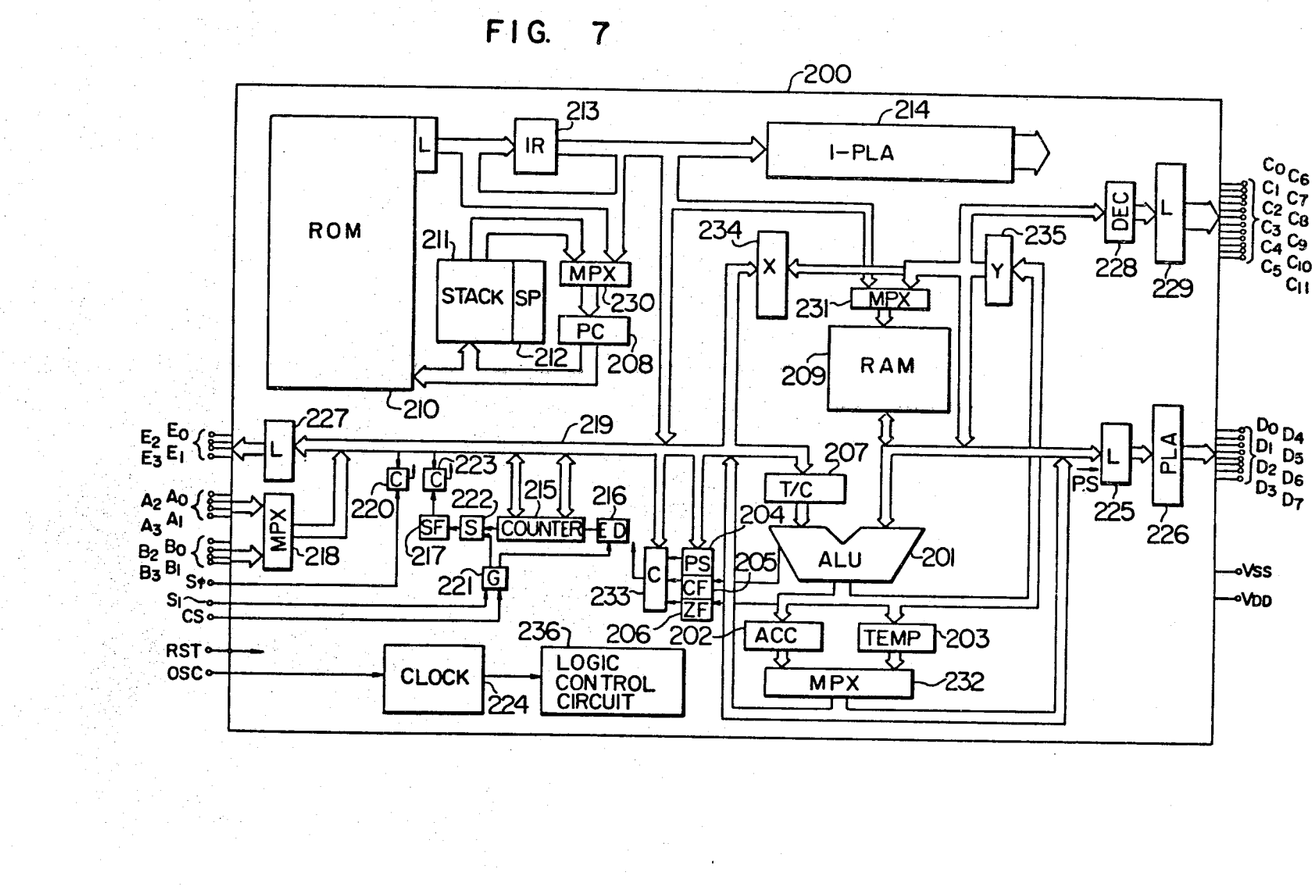
FIG. 7 is a diagram showing the configuration of a microcomputer making up a part of the control unit according to the present invention.

A block diagram of a configuration of the microcomputer 200 is shown in FIG. 7. The functions and the data processing of the microcomputer 200 will be briefly explained with reference to FIG. 7.

A first function is a logic calculation which is attained by a logic calculation unit ALU 201, an accumulator ACC 202, a temporary register TEMP 203, a program status flags PS 204, a carry flag 205, a zero flag 206, a twos complement T/C 207 and 4-bit A and B buses for data transmission. The logic calculation section ALU 201 is capable of executing the operation of AND, OR, exclusive OR and addition. The twos complement T/C 207 is for calculating the complement of 2 for the data transmitted to ALU 201 and therefore ALU 201 is capable of executing the subtracting operation.

PS 204, CF 205 and ZF 206 show 1-bit flip-flops for storing the system conditions. The flip-flop PS 204 is a flag set or reset in response to a command. The flip-flops CF 205 and ZF 206 are used for various decisions in program execution in such a manner that the flip-flop ZF 206 is set or reset depending on whether or not the calculation result of the flip-flop CF 205 is zero, which is determined from the presence or absence of a carrier on the basis of the calculation result of the logic calculation unit ALU 201 or the like.

Symbols ACC 202 and TEMP 203 show 4-bit registers for temporarily storing the input data and the calculation result of the logic calculation unit ALU 201.

A second function is data storage. This function is performed by a variable memory RAM 209, an X register 234 and a Y register 235. The addresses of the variable memory RAM 209 are designated by the X and Y registers so that the data stored in RAM 209 is capable of being transferred to the register ACC 202 or the like in response to a command.

A third function is to store and execute a program. This function is performed by a fixed memory ROM 210, a program counter PC 208, subroutine stack STACK 211 and a stack pointer SP 212. The fixed memory ROM 210 is for storing a program to be executed of a system which is written in 8-bit instruction words, and the program counter PC 208 comprising a binary counter is for designating the addresses of the fixed memory ROM 210. Thus with the counting up of the program counter PC 208, the program stored in the fixed memory ROM 210 is executed word by word. The subroutine stack STACK 211 is for storing the data of PC 208 in order to designate an address upon return from the subroutine. The stack pointer SP is for designating an address of a first return in execution of the subroutine in two levels.

A fourth function is that of decoding a command. This function is accomplished by an instruction register IR 213 and an instruction programmable logic array I-PLA 214. The instruction register IR 213 is for latching the 8-bit instruction words transferred from the fixed memory 210 while the instruction is being executed, and contains 8-bit data. The instruction programmable logic array I-PLA 214 performs the function of converting the 8-bit instruction words transferred from the fixed memory ROM 210 into a control signal, so that the 8-bit instruction words stored in the fixed memory 210 are converted sequentially into various control signals, which are transmitted to the other operating sections such as ALU, ACC and RAM, with the result that the microcomputer operates on the basis of the program stored in the fixed memory ROM 210.

A fifth function is that of a counter. A counter 215 is an 8-bit binary counter, and is set or reset by a counter flip-flop E/DFF 216. After the counter 215 is rendered ready for the counting operation by the flip-flop E/DFF 216, the input pulses from the input terminal $S_1$ are counted up, and when the pulses are counted up to the most significant bit MSB, the set flag SF 217 is set. Thus, by setting or resetting the flip-flop E/DFF 216 in response to a command from the fixed memory ROM 210 to see whether the set flag SF 217 is set or not, it is possible to count the number of pulses from the input terminal $S_1$.

Also, the data in the counter 215 may be divided into the high-order 4 bits and the low-order 4 bits for direct transfer to the register ACC 202 or the like.

A sixth function is an input-output function. Input terminals include 4-bit parallel input terminals $A_0$ to $A_3$ and 4-bit parallel input terminals $B_0$ to $B_3$. These two sets of parallel inputs $A_0$ to $A_3$ and $B_0$ to $B_3$ may be selectively transferred to the register ACC 202 or the like by a multiplexer MPX 218 through a B bus 219. These inputs $A_0$ to $A_3$ and $B_0$ to $B_3$ are used for data input.

The other input terminals include input terminals $S_\phi$ and $S_1$. These input terminals are conveniently used for counting pulse signals or interruption without regard to the clock of the microcomputer. The high or low state of the input $S_\phi$ is determined by the comparator C 220. The input $S_1$ is applied to the counter 215 through the gate 221 or directly applied to the set flag SF 217 through a synchronizing circuit S 222 and compared at the comparator C 223. In this way, the input $S_1$ is used in similar fashion to the input $S_\phi$. Whether or not the input $S_1$ is to be applied to the counter 215 is determined by the input at the terminal CS.

The input terminal RST is used for holding the start (0 address) of the program stored in the fixed memory ROM 210 until the power supply for the microcomputer is established at the time of initial power throw-in, thus preventing any malfunction. Under this condition, all the output terminals are at $L_0$. The input terminal OSC is a terminal for connecting a capacitor and a resistor for determining the oscillation frequency of the built-in oscillator 224. Using the oscillation frequency of this oscillator as a clock, the logic control circuit 236 controls the internal operation of the microcomputer. Characters $V_{SS}$ and $V_{DD}$ show power terminals.

The output terminals are of three types. A first group of output terminals is an output terminal group D including the output terminals $D_0$ to $D_7$. When the data in the memory RAM 209 or the register ACC 202 and the flip-flop PS 204 are latched by the latch 225 and transferred to the programmable logic array PLA 226 as 5-bit data, the particular data of 5 bits are produced as parallel 8-bit data at the eight output terminals $D_0$ to $D_7$. Thus the output terminals $D_0$ to $D_7$ are suitable for display on a 7-segment display tube.

A second output terminal group E includes output terminals $E_0$ to $E_3$ wherefrom 4-bit data are produced in parallel through the register ACC 202 or the fixed memory ROM 210. Numeral 227 shows a latch.

A third output terminal group C includes output terminals $C_0$ to $C_{11}$. These outputs C may be set or reset independently of each other. Specifically, when the Y register 235 designates a particular output terminal C to be set and issues an output command, the particular output terminal is latched by the latch 229 through the decoder 228 for producing an output. Thus various loads may be controlled by the output terminal C. Numerals 230, 231 and 232 show multiplexers and numeral 233 a comparator.

The foregoing is a brief description of the functions and data processing of the microcomputer shown in FIG. 7. The present invention includes an embodiment using such a microcomputer.

Figure 8:
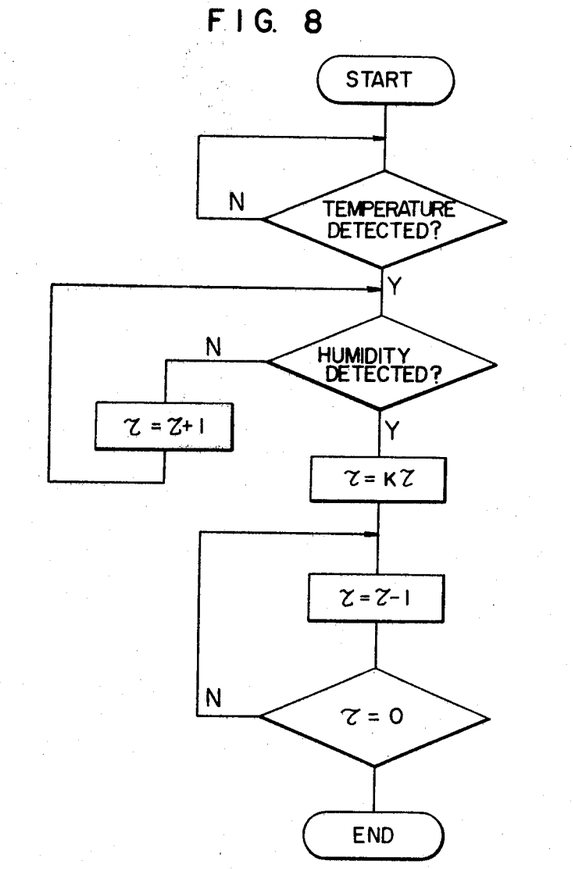
FIG. 8 is a general flowchart for a first embodiment of the heating control program for the microcomputer shown in FIG. 7.

A flowchart of a heating control program using a microcomputer is generally shown in FIG. 8. As described with reference to FIG. 8, with the heating of the food in the oven, the food temperature increases soon as shown in FIG. 2 and reaches the set value $T_o$ of the surface temperature, thus producing the temperature detection signal TEMP shown in FIG. 4A. This temperature detection signal is applied to the input terminal $B_2$ of the microcomputer and stored as data therein.

Next, the food begins to discharge water steam actively, so that the minimum value holding circuit 24 of FIG. 4B maintains the minimum value of the humidity signal. At the same time, the relative humidity increases from the minimum value thereof. This relative humidity is subtracted from the minimum value at the subtractor 25, and when the relative humidity increases by the threshold value $\Delta h$ from the minimum value, the comparator 26 produces a humidity detection signal HUM. This humidity detection signal is applied to the input terminal $B_3$ of the microcomputer and stored as data therein.

The program stored is executed. As shown in the flowchart of FIG. 8, it is determined whether or not the temperature is detected. The data in the variable memory RAM 209 is accumulated during the time period $\tau_o$ from the time point $t_1$ of temperature detection to the time point $t_2$ of humidity detection. Next, it is determined whether or not humidity is detected, and if the answer is YES, the data in the variable memory RAM 209 is multiplied by K, thus determining the time length $\tau_R$ from the time point $t_2$ to time point $t_3$ in FIG. 2. Subsequently, the time length $\tau_R$ is consumed until the data in the variable memory RAM is reduced to "0". Specifically, at the time point $t_3$ when it is determined that the data in the memory RAM is reduced to "0", the start-stop signal STA/$\overline{STO}$ is produced from the output terminal $C_5$ of the microcomputer. This signal is applied to the heating control circuit 27 in FIG. 5, so that the magnetron 28 is stopped, thus completing the cooking.

The time periods $\tau_o$ and $\tau_R$ are realized by counting within the RAM range the clock pulses CLOCK (of, say, commercial frequency) providing a time standard which are impressed from the input terminal So of the microcomputer.

As described above, according to the present invention, the time point when a predetermined setting of the temperature of the food heated is detected by an infrared ray detector, and the food is further heated for a time period obtained by multiplying a constant K specific to the food involved by the heating time from the above-mentioned detected time point to the time point of the detection of the humidity starting to rise as the result of active discharge of steam from the food, thus obviating the shortcomings of the conventional methods. The setting of the surface temperature of the food corresponds to the initial temperature of the food in the prior art, and therefore the constant K in equation (3) takes a new value for each type of food to be cooked.

The value of K may be obtained experimentally for a particular item of food. Assume, for instance, that a temperature setting considered a new initial temperature is set at 50° C., that the food is heated as a first stage for the time period $\tau_o'$ from 50° C. at which the food begins to be heated to the time point of humidity detection due to active generation of water steam from the food, and that the food is further heated for a time period $\tau_R'$ from the time point of humidity detection to a time point when the food is properly cooked. In this case, the new constant K is given as $\tau_R'/\tau_o'$ from FIG. 2 or equation (3).

Now, the construction and functions of the present invention will be explained with reference to a second embodiment of a cooking oven employing the food heating control method according to the invention.

The construction of the cooking oven is shown in FIG. 3.

Figure 9:
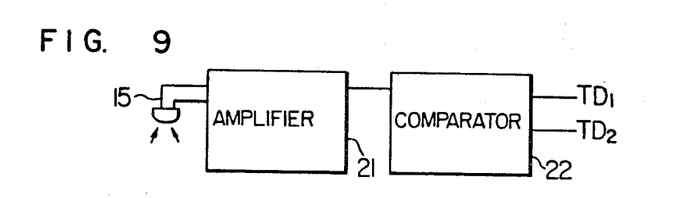
FIG. 9 is a diagram showing the construction of second and third embodiments of temperature detector means of a cooking oven according to the present invention.

Referring to FIG. 9, numeral 15 shows an infrared ray detector, numeral 21 an amplifier for amplifying the temperature signal of the infrared ray detector, and numeral 22 a comparator for comparing the output of the amplifier 21 with the temperature setting $T_1$, and producing a temperature detection signal $TD_2$ if the former is larger than the latter. An embodiment of the humidity detector is as shown in FIG. 4B.

Figure 10:
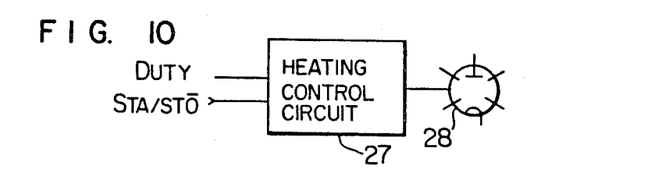
FIG. 10 shows the construction of second and third embodiments of the heating control means of the same cooking oven.

In FIG. 10, numeral 27 shows a heating control circuit which controls activation and deactivation of the magnetron 28 by the input of the magnetron start-stop signal STA/$\overline{STO}$.

Figure 11:
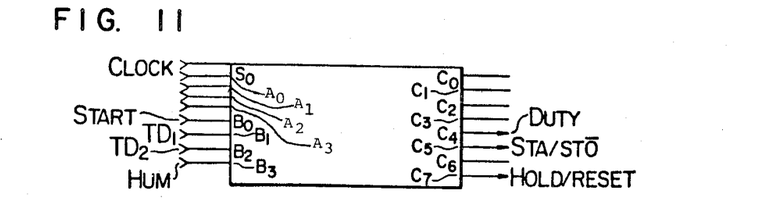
FIG. 11 is a diagram showing the construction of second and third embodiments of the control unit of the same cooking oven.

FIG. 11 shows a control unit using an LSI chip. This embodiment uses a microcomputer including a general-purpose LSI chip of the stored program type. Reference characters $A_0$, $A_1$, $A_2$, $A_3$, $B_0$, $B_1$, $B_2$ and $B_3$ show input terminals, and characters $C_0$, $C_1$, $C_2$, $C_3$, $C_4$, $C_5$, $C_6$ and $C_7$ output terminals. The input terminals $B_0$, $B_1$, $B_2$ and $B_3$ are impressed with the heating start signal START, the temperature detection signals $TD_1$ and $TD_2$ and the humidity detection signal HUM respectively. The magnetron start-stop signal STA/$\overline{STO}$, and the hold-erase signal HOLD/RESET for the holding voltage of the minimum value holding circuit 24 are produced from the output terminals $C_5$ and $C_7$ respectively. The input terminal So is impressed with clock pulses as in the first embodiment. The microcomputer making up a part of the control unit is the same as the one employed in the first embodiment.

Figure 12:
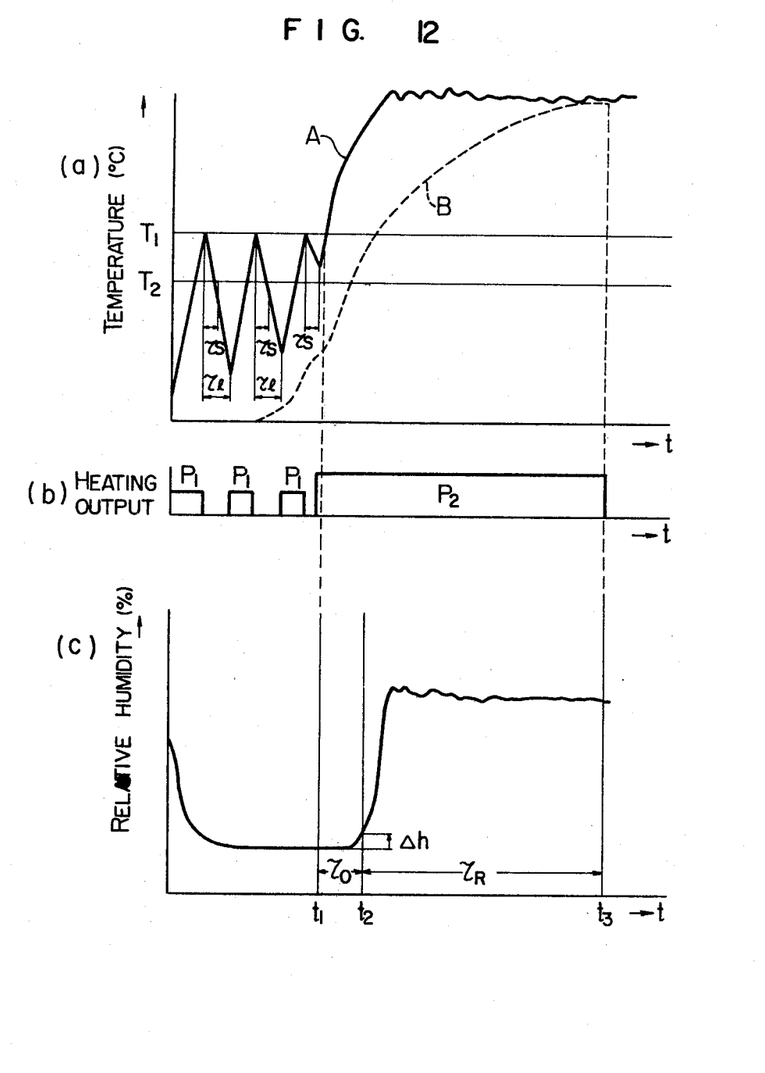
FIG. 12 shows curves of the food surface temperature, the food heating output and the relative humidity respectively in a second embodiment of the method according to the present invention.

FIG. 12 shows at (a) the food surface temperature (curve A) changing with the heating of the food whereas a dotted line curve B shows the internal temperature of the food, and FIG. 12 shows at (b) the relation between the heating output and time. The graph of FIG. 12 at (c) shows a curve of relative humidity in the case where the heating output shown in FIG. 12 at (b) is used for heating the food.

Figure 13:
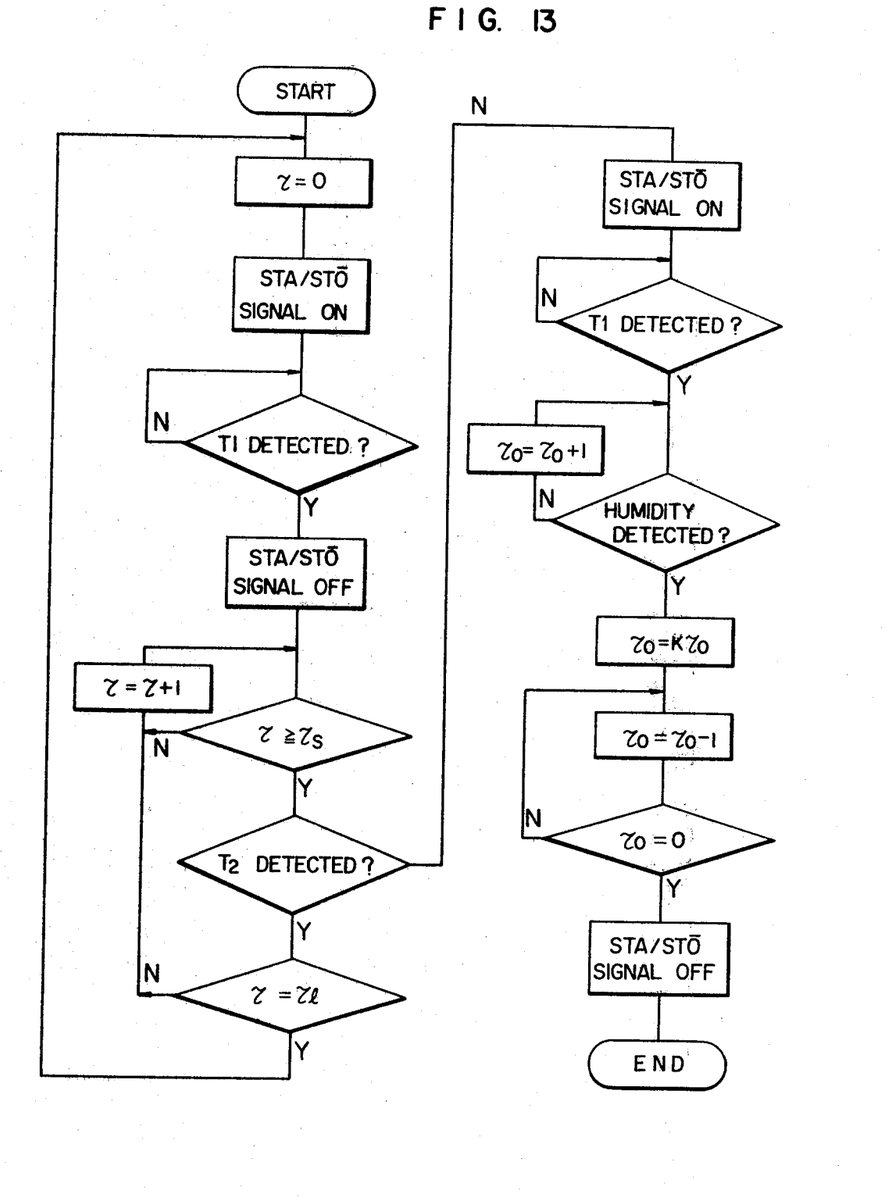
FIG. 13 is a general flowchart according to a second embodiment of the heating control program for the microcomputer of FIG. 7.

A flowchart for the heating control program of the microcomputer is generally shown in FIG. 13.

The operation of the cooking oven according to the present invention will be explained below with reference to FIGS. 3 to 13.

As shown in FIG. 3, the food 6 is heated in the oven. It will be seen from FIGS. 12 and 13 that the food is heated with the first heating output $P_1$ and when the surface temperature of the food reaches a first set temperature, the temperature detection signal $TD_1$ shown in FIG. 9 is produced. This temperature detection signal is applied to the input terminal $B_1$ of the microcomputer in FIGS. 11 and 7 and stored as data therein. As a result, the answer is YES at the step of determining whether the set value $T_1$ is detected or not in FIG. 13, thus stopping the heating of the food. The memory RAM increases the value $\tau$ by a predetermined time length $\tau_e$. After the idle time has passed the time $\tau_e$, it is determined that $\tau=\tau_e$ and $\tau$ is restored to zero for reheating. In similar fashion, when the first temperature setting $T_1$ is reached, the heating is stopped and after a predetermined time $\tau_e$, the heating is restarted. In the case where in the process of repetition of the heating and idle states the second set temperature $T_2$, which is slightly lower than the first set temperature, is not reached i.e., the answer is NO at the step of determining whether or not the temperature $T_2$ is detected after the answer of YES is given at the step of determining whether or not $\tau \geq \tau_s$ upon the lapse of a predetermined time length $\tau_s$ following the start of a given idle cycle, namely, in the case where the temperature detection signal $TD_2$ shown in FIG. 9 fails to be applied to the microcomputer during such a given idle cycle, the process of repetition of the heating and idle states is stopped and the heating with the second heating output $P_2$ is immediately started. In this case, the heating output is changed in such a manner that the microcomputer is loaded with the data stored in the RAM including the duty cycle of the microwave power and the duty output DUTY is produced from the output terminal $C_4$, followed by the application thereof to the heating control circuit in FIG. 10, thus increasing the output of the magnetron 28. When the first set temperature $T_1$ is reached, the temperature detection signal $TD_1$ shown in FIG. 9 is produced. This output is applied to the microcomputer and stored as data therein. As a result, it is determined that the temperature $T_1$ has been detected as shown in FIG. 13. This detected temperature $T_1$ is used in this invention as the initial food temperature in the prior art.

The relative humidity, on the other hand, initially decreases with the increase in the temperature of the inside of the oven in view of the small amount of vapor discharged from the food as shown in FIG. 12 at (c). When the heating of the food by the second heating output is started with the amount of vapor increased, the relative humidity takes a minimum value, followed by an upturn at a sharp gradient. The circuit shown in FIG. 4B produces the humidity detection signal HUM when the relative humidity increases slightly by the threshold value $\Delta h$ from the minimum value. This signal is applied to the microcomputer and stored therein as data. As shown in FIG. 13, the memory RAM increases the data stored therein during the period $\tau_0$ from the temperature detection (detection of the new initial temperature $T_1$) and the humidity detection. When it is decided that humidity is detected, the data in the memory RAM is multiplied by K with the result that the time period $\tau_R$ from the time points $t_2$ to $t_3$ shown in FIG. 12 at (c) is attained. With the subsequent decrease in time length value $\tau_R$ until reduction of the data in the RAM to zero, it is decided that the data in the RAM has been reduced to zero at time point $t_3$, so that the start-stop signal $STA/\overline{STO}$ is produced from the output terminal $C_5$ of the microcomputer. This signal is applied to the heating control circuit 27 in FIG. 10, and the magnetron 28 is stopped, thus completing the cooking.

The time lengths $\tau_0$ and $\tau_R$ are determined by counting within the RAM range the clock pulses CLOCK (such as of commercial frequency) which are applied as a time reference through the input terminal $S_0$ of the microcomputer.

A third embodiment of the present invention will be described below with reference to FIGS. 14 and 15 in addition to FIGS. 3 to 11.

Figure 14:
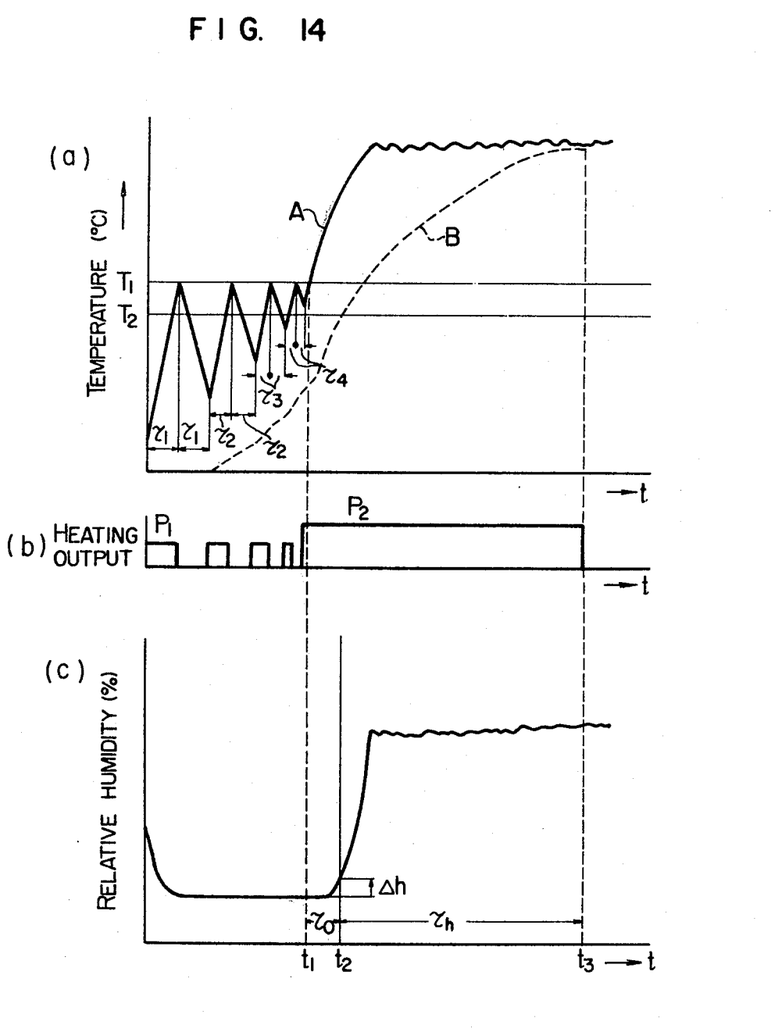
FIG. 14 shows graphs showing curves of the food surface temperature, the food heating output and the relative humidity in a third embodiment of the method of the present invention.
Figure 15:
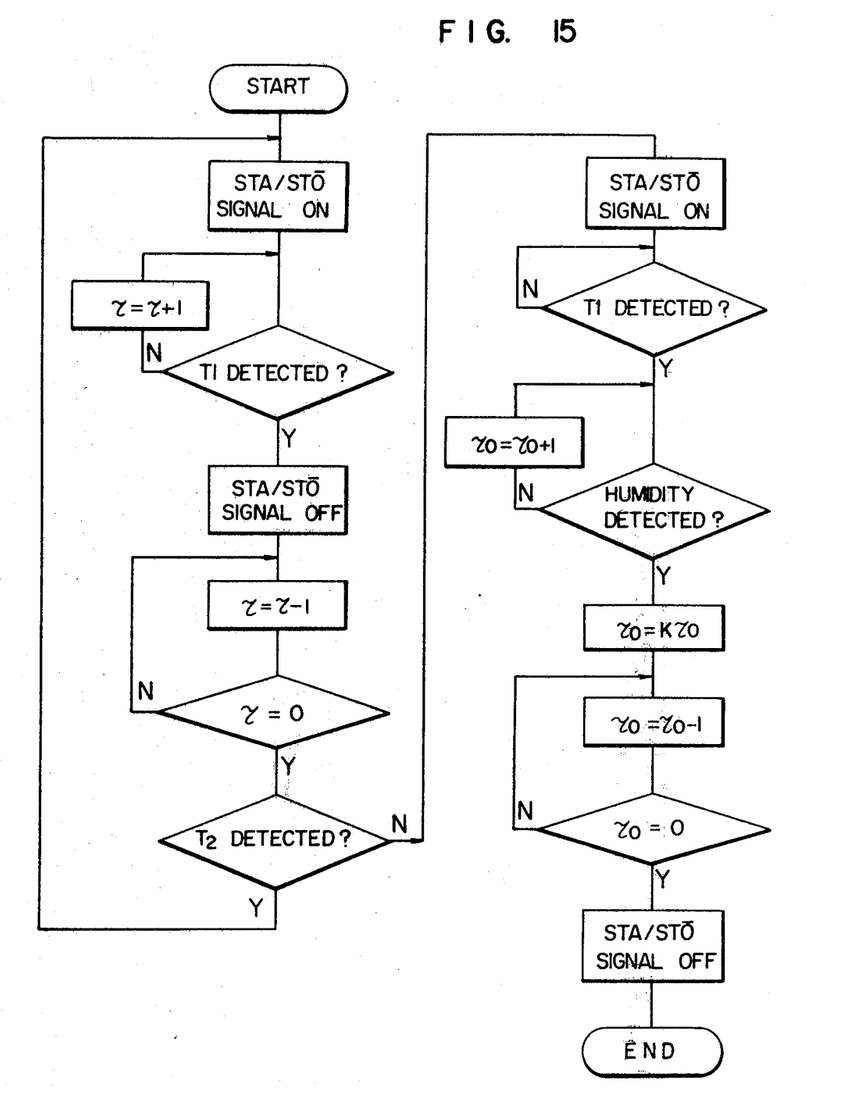
FIG. 15 is a general flowchart according to a third embodiment of the heating control program for the microcomputer of FIG. 7.

The food surface temperature (curve A) changing with the heating time is shown in FIG. 14 at (a), and the relation between the heating output and time in FIG. 14 at (b). The change of the relative humidity with the heating by the heating output of FIG. 14 at (b) is shown in the curve of FIG. 14 at (c). A flowchart of the program of heating control by the microcomputer is generally shown in FIG. 15.

As shown in FIG. 3, the food 6 is heated within the oven. First, as shown in FIGS. 14 and 15, the food is heated with the first heating output $P_1$, and when the food surface temperature reaches the first set temperature $T_1$, the temperature detection signal $TD_1$ shown in FIG. 9 is produced. This temperature detection signal is applied to the input terminal $B_1$ of the microcomputer in FIGS. 11 and 7 and stored as data therein. As a result, as shown in FIG. 15, the affirmative answer is given at the step of determining whether or not the temperature $T_1$ is detected, thus stopping the heating of the food. During the start of heating to the time point of this stoppage, the memory RAM increases the data therein $\tau$ up to $\tau_1$. The heating is thus suspended for the same time $\tau_1$ as the heating time, as shown in FIG. 14 at (a). In other words, it is shown in FIG. 15 that the suspension of heating continues until the data in the memory RAM is reduced to "0". When it is decided that the data in the memory RAM is reduced to zero, the start-stop signal $STA/\overline{STO}$ is produced from the output terminal $C_5$ of the microcomputer. This signal is applied to the heating control circuit 27 in FIG. 10 and drives the magnetron 28. As a result, the food is reheated and repeats a similar process, so that when the first temperature setting $T_1$ is reached, the heating is suspended for the time period $\tau_2$ which is the same as the time length of the immediately preceding heating process, the food being reheated after such a suspension. During this repetition of heating and suspension, if the food temperature is not reduced to the second temperature setting $T_2$ slightly lower than the first temperature setting $T_1$ in a particular suspension or idle time, or if the answer to the question of whether or not the temperature $T_2$ is detected is NO, or more specifically, if the temperature detection signal shown in FIG. 9 is applied to the microcomputer, then the repetition of heating and suspension of heating is stopped, immediately followed by the heating with the second heating output $P_2$. The operation after start of heating the food with the second heating output $P_2$ is exactly the same as that in the preceding embodiment.

In the oven of the second and third embodiments using the above-mentioned method of control, the error in the total heating time which otherwise might be conspicuously caused by the variation in the initial temperature of the food to be cooked is greatly reduced.

After increasing to the first set temperature $T_1$ by heating, the food surface temperature decreases with time, after stoppage of heating, due to discharge of heat from the surface and heat transfer because of the temperature gradient with the low temperature inside of the food. The shorter the period of reduction of the surface temperature, the greater the temperature gradient as when the internal temperature of the food is low during the suspension period in the initial stage of repetition of heating and suspension. With the advance of heating after many repetitions of heating and suspension, however, the internal temperature of the food increases, so that the temperature gradient is reduced with the result that it takes a longer time for the surface temperature to decrease. In the above-mentioned embodiment of the cooking oven, after the lapse of a predetermined time length $\tau_s$ in a suspension or idle cycle in which the food surface temperature fails to decrease to the second set temperature $T_2$ after such predetermined time length $\tau_s$, the food is immediately heated with the second heating output. In another embodiment, when the food surface temperature fails to decrease to the second set temperature $T_2$ after suspension for the same time length as the immediately preceding heating cycle, the repetition of heating and suspension is terminated and the heating with the second heating output is immediately started. In this way, the lower the food temperature, the fewer the heating-suspension cycles. Therefore, in spite of the variation in the initial temperature of the food, the internal temperature of the food takes a value approximate to the surface temperature thereof regardless of the type of food when the food begins to be heated with the second heating output, thereby greatly reducing the effect of the variation of the food initial temperature on the time $\tau_o$ from the first set temperature $T_1$ to the humidity detection in the above-mentioned embodiment. The heating with the second heating output $P_2$ is started only after a substantially uniform temperature of the food including the internal temperature thereof is reached and then the time $\tau_o$ from the set temperature $T_1$ to the humidity detection is determined, so that the value $\tau_o$ includes the data on the quantity, material and form of the food and is not substantially affected by the food initial temperature.

The dashed curves B in FIGS. 12 at (a) and 14 at (a) represent the change in the estimated value of the food internal temperature.

The aforementioned two embodiments refer to a method of control using the repetition of heating and suspension. If the time of heating and suspension is reduced to heat the food with an output having a lower duty ratio, it is equivalent to heating the food with a low output.

The first heating output $P_1$ and the second heating output $P_2$ preferably take values specific to each food item to be cooked. This is for the reason that some food is required to be heated with comparatively low power in order to complete the heating with the internal temperature thereof approximate to the surface temperature thereof, while other food is required to be heated with high power within a comparatively short time in spite of the difference between internal and surface temperatures.

In the above-mentioned three embodiments, humidity is detected at time point $t_2$ when humidity begins to increase as the food heated violently discharges vapor. As an alternative, the time point when the concentration of the gas discharged from the food begins to increase may be detected with equal effect.

What is claimed is:

1. Heating apparatus including an oven and means for generating heating power for cooking foodstuffs, comprising:

means for generating a temperature signal corresponding to the surface temperature of said foodstuff;

means for amplifying said temperature signal and comparing said signal with a predetermined temperature setting, said means producing a temperature detection signal TEMP at a time $t_1$;

means for generating at least one of a humidity and gas concentration signal corresponding to the humidity and gas concentration within said oven;

means for amplifying a selected one of said humidity and gas concentration signals and producing a detection signal HUM at a time $t_2$ when said one of said humidity and gas concentration begins to increase;

means for starting and stopping said means for generating heating power;

means for receiving and storing said temperature signal and one of said humidity and gas concentration signals; and a microprocessor for storing said signals and storing and executing a program for the sequence control of the operations of said respective means.

2. Heating apparatus including an oven and means for generating electric heating power for cooking foodstuffs in said oven, comprising:

means for generating a temperature signal corresponding to the surface temperature of said foodstuff;

means for amplifying said temperature signal and comparing two set values with each other, said means producing a temperature detection signal $TD_1$ when the temperature of the food heated reaches a temperature $T_1$, said means producing a temperature detection signal $TD_2$ when the food temperature is reduced below the temperature $T_2$, where $T_2$ is less than $T_1$;

means for generating at least one of a humidity and gas concentration signal corresponding to the humidity and gas concentration within said oven means for amplifying a selected one of said humidity and gas concentration signals and producing a signal HUM at the time when said one of said humidity and gas concentration begins to increase;

means for starting and stopping said means for generating electric heating power;

means for receiving and storing said temperature detection signals $TD_1$ and $TD_2$ and selected one of said humidity detection signal and said gas concentration detection signal HUM; and a microprocessor for storing said signals and storing and executing a program for the sequence control of the operations of said respective means.

3. A method of controlling the heating of a foodstuff in a cooking oven chamber comprising the steps of:

(a) detecting the surface temperature of the foodstuff;

(b) detecting a change in the ambiance condition within said chamber by sensing one of a vapor and gas discharged from said foodstuff;

(c) heating said foodstuff until the surface temperature of said foodstuff reaches a predetermined value at a time $t_1$ by heating said foodstuff at a relatively low initial heat output to raise the internal temperature thereof to the approximate temperature of its surface, said heating step including the substeps of (1) heating said foodstuff until the surface temperature thereof reaches a first predetermined value $T_1$, (2) suspending the heating of said foodstuff for a predetermined length of time $\tau_e$, (3) reheating said foodstuff, (4) again suspending the heating of said foodstuff for said predetermined length of time $\tau_e$ after the surface temperature of said foodstuff reaches said first predetermined value $T_1$, (5) repeating said heating and suspension substeps, (6) stopping said heating and suspension substeps when in any one of said suspension substeps the surface temperature of said foodstuff is not reduced below a second predetermined value $T_2$ after a predetermined time period $\tau_s$, where $T_2$ is less than $T_1$, and (7) detecting the time $t_1$ when the surface temperature reaches the first predetermined value $T_1$;

(f) further heating said foodstuff from said time $t_1$ for a time period $\tau_0$ until a time $t_2$ when the change in detected ambiance condition corresponds to a predetermined condition; and (g) still further heating said foodstuff for a time period $\tau_R$ determined by multiplying a heating time coefficient K which is specific to said foodstuff by said heating time period $\tau_0$.

4. A method of controlling the heating of a foodstuff in a cooking oven chamber comprising the steps of:

(a) detecting the surface temperature of the foodstuff;

(b) detecting a change in the ambiance condition within said chamber by sensing one of a vapor and gas discharged from said foodstuff;

(c) heating said foodstuff until the surface temperature of said foodstuff reaches a predetermined value at a time $t_1$ by heating said foodstuff at a relatively low initial heat output to raise the internal temperature thereof to the approximate temperature of its surface, said heating step including the substeps of (1) heating said foodstuff until the surface temperature thereof reaches a first predetermined value $T_1$, (2) suspending the heating of said foodstuff for the same length of time as the immediately preceding heating time, (3) reheating said foodstuff until the surface temperature thereof reaches said first predetermined value $T_1$, (4) suspending the heating of said foodstuff for the same length of time as the immediately preceding heating time measured from the time when said first predetermined value $T_1$ is reached, (5) repeating said heating and suspension substeps, (6) stopping said heating and suspension substeps when in any one of said suspension substeps the surface temperature of said foodstuff is not reduced below a second predetermined value $T_2$, where $T_2$ is less than $T_1$, and (7) detecting the time $t_1$ when the surface temperature reaches the first predetermined value $T_1$;

(d) further heating said foodstuff from said time $t_1$ for a time period $\tau_0$ until a time $t_2$ when the change in detected ambiance condition corresponds to a predetermined condition; and (e) still further heating said foodstuff for a time period $\tau_R$ determined by multiplying a heating time coefficient K which is specific to said foodstuff by said heating time period $\tau_0$.

5. A method of controlling the heating of a foodstuff in a cooking oven chamber comprising the steps of:

(a) detecting the surface temperature of said foodstuff by sensing the infrared rays irradiated therefrom;

(b) detecting a change in the ambiance condition within said chamber by sensing one of a vapor and gas discharged from said foodstuff;

(c) heating said foodstuff until the sensed surface temperature of said foodstuff reaches a predetermined value $T_1$ at time $t_1$;

(d) further heating said foodstuff from said time $t_1$ until a time $t_2$ when said change in detected ambiance condition corresponds to a violent discharge from said foodstuff of said vapor and gas; measuring a time period $\lambda_0$ from said time $t_1$ until said time $t_2$; and (e) still further heating said foodstuff for a time period $\lambda_R$ determined by multiplying a heating time coefficient K which is specific to said foodstuff by said measured heating time period $\lambda_0$.

6. A method of controlling the heating of a foodstuff according to claim 5, wherein, in the step of heating said foodstuff from said time $t_1$ to said time $t_2$, said predetermined condition at said time $t_2$ is determined by detecting and holding a minimum value of the relative humidity changed by the vapor discharged from the foodstuff and detecting that the relative humidity increases by a predetermined threshold value from said minimum value thereby detecting the time $t_2$ when the humidity begins to increase.

7. A method of controlling the heating of a foodstuff according to claim 5, wherein the step of heating said foodstuff until its surface temperature reaches said predetermined value at the time $t_1$ is achieved by heating said foodstuff at a relatively low initial heat output to raise the internal temperature thereof to the approximate temperature of its surface, and the step of further heating said foodstuff from said time $t_1$ to said time $t_2$ is carried out until the change in the ambiance condition corresponds to an increase in the concentration of one of said vapor and gas due to the abrupt liberation thereof from said foodstuff.

* * * * *